US 9,313,176 B2

(12) United States Patent
Rogers et al.

(10) Patent No.: US 9,313,176 B2
(45) Date of Patent: *Apr. 12, 2016

(54) SYSTEM AND METHOD FOR ESTABLISHING A SECURE WIRELESS COMMUNICATION PATH

(75) Inventors: Frederick C. Rogers, Olathe, KS (US);
Lyle T. Bertz, Lee's Summit, MO (US);
Jeremy R. Breau, Leawood, KS (US);
Salvador Cerda, Jr., Peculiar, MO (US);
Gene S. Mitchell, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 980 days.

This patent is subject to a terminal disclaimer.

(21) Appl. No.: 13/456,890

(22) Filed: Apr. 26, 2012

(65) Prior Publication Data

US 2012/0210316 A1 Aug. 16, 2012

Related U.S. Application Data

(63) Continuation of application No. 11/777,655, filed on Jul. 13, 2007, now Pat. No. 8,195,812.

(51) Int. Cl.
*G06F 15/16* (2006.01)
*H04L 29/06* (2006.01)
*H04W 12/02* (2009.01)

(52) U.S. Cl.
CPC ........... *H04L 63/0272* (2013.01); *H04W 12/02* (2013.01)

(58) Field of Classification Search
USPC ....................................................... 709/227
See application file for complete search history.

(56) References Cited

U.S. PATENT DOCUMENTS

| 6,925,069 | B2 | 8/2005 | Koos, Jr. et al. |
| 7,376,827 | B1* | 5/2008 | Jiao ............................... 713/153 |
| 7,600,003 | B1* | 10/2009 | Okmianski et al. ........... 709/220 |
| 8,195,812 | B1* | 6/2012 | Rogers et al. .................. 709/228 |
| 8,509,440 | B2* | 8/2013 | Kaippallimalil .............. 380/270 |
| 2002/0100036 | A1* | 7/2002 | Moshir et al. .................. 717/173 |
| 2004/0068668 | A1* | 4/2004 | Lor et al. ........................ 713/201 |
| 2004/0095382 | A1* | 5/2004 | Fisher et al. ................... 345/744 |
| 2004/0116119 | A1* | 6/2004 | Lewis et al. ................. 455/435.1 |
| 2004/0264700 | A1 | 12/2004 | Kirkland |
| 2005/0027890 | A1 | 2/2005 | Nelson et al. |
| 2005/0097223 | A1 | 5/2005 | Shen et al. |
| 2005/0243737 | A1* | 11/2005 | Dooley et al. .................. 370/254 |
| 2005/0257267 | A1 | 11/2005 | Williams et al. |
| 2006/0067209 | A1 | 3/2006 | Sheehan et al. |
| 2006/0159107 | A1 | 7/2006 | Burnett |
| 2006/0161775 | A1* | 7/2006 | O'Brien et al. ................ 713/170 |
| 2006/0191005 | A1 | 8/2006 | Muhamed et al. |
| 2006/0195900 | A1 | 8/2006 | Yeh et al. |
| 2006/0242271 | A1 | 10/2006 | Tucker et al. |
| 2007/0027964 | A1* | 2/2007 | Herrod et al. .................. 709/220 |
| 2007/0225075 | A1* | 9/2007 | Loose .............................. 463/42 |
| 2008/0013474 | A1* | 1/2008 | Nagarajan et al. ............. 370/321 |
| 2008/0076393 | A1* | 3/2008 | Khetawat et al. .............. 455/411 |
| 2008/0279133 | A1* | 11/2008 | Bienfait et al. ................ 370/315 |
| 2012/0084438 | A1* | 4/2012 | Raleigh et al. ................. 709/224 |
| 2013/0039213 | A1* | 2/2013 | Averbuch et al. .............. 370/254 |
| 2013/0239500 | A1* | 9/2013 | Pendley et al. ............... 52/302.1 |
| 2014/0173577 | A1* | 6/2014 | Mitchell et al. ............... 717/168 |
| 2014/0280809 | A1* | 9/2014 | Li et al. .......................... 709/222 |

* cited by examiner

*Primary Examiner* — Michael Y Won

(57) ABSTRACT

A communication system automatically provides a secure communication link between a device and a network. A switch initiates a wireless link between the switch and the network. Then, a secure communication path is created between the switch and the network. When a device is linked to the switch, the device is automatically granted access to the secure communication path created by the switch.

20 Claims, 4 Drawing Sheets

SYSTEM AND METHOD FOR ESTABLISHING A SECURE WIRELESS COMMUNICATION PATH

RELATED CASES

This patent application is a continuation of U.S. patent application Ser. No. 11/777,655 that is entitled "A SYSTEM AND METHOD FOR ESTABLISHING A SECURE WIRELESS COMMUNICATION PATH" and that was filed on Jul. 13, 2007. U.S. patent application Ser. No. 11/777,655 is hereby incorporated by reference into this patent application.

TECHNICAL FIELD

The invention is related to the field of communication, and in particular, to automatically establishing a secure communication path between a network and a device.

BACKGROUND

The Internet is used for numerous activities that include secure communication between devices or elements that are managed by a common entity. For example, a corporation may have hundreds or thousands of remote devices that are disbursed geographically over many hundreds of miles. To provide secure communication to all of their devices, a corporation will utilize the Internet in combination with additional security protocols. This provides an efficient mechanism for providing communication for the entire enterprise.

Administrators of these distributed networks require secure communication paths to each of the remote devices. Unfortunately, many of the remote devices may not have the resources necessary to provide such communication. Further, it may be unfeasible to provide such capabilities on each remote device.

Communication networks commonly contain many network elements that require maintenance and configuration. Many of the network elements lack sophisticated resources for providing a secure communication path to a central location. If an administrator desires to manage multiple network elements from a remote location, the administrator would require that each of the network elements have sophisticated communication capabilities between the administrator's locations and network elements' location.

In other applications, network operators may wish to provide users with access to high-bandwidth virtual private networks (VPNs). For example, a local law enforcement agency may want to provide each unit with the capability of sending highly sensitive data to a central node. Each unit may be equipped with numerous devices such as a portable computer, handheld computers, video cameras and other electronic devices. Unfortunately, each device would be required to have the proper security and communication resources and would then have to establish its own communication link.

SUMMARY

Generally described, a communication system is provided for automatically establishing a secure wireless communication link between a device and a control node. After a switch establishes a wireless link and a secure communication path between the switch and the network, a device is automatically granted access to the secure communication path when it is linked to the switch.

In another aspect of the invention, a method is provided in a communication system that automatically provides a secure communication link between a device and a control node. A switch initiates a wireless link between the switch and the network. Then, a secure communication path is created between the switch and the network. When a device is linked to the switch, the device is automatically granted access to the secure communication path created by the switch.

BRIEF DESCRIPTION OF THE DRAWINGS

FIG. 4 is a flow diagram illustrating a preferred method for configuring a communication switch.

DETAILED DESCRIPTION OF THE PREFERRED EMBODIMENT

System Description

Figure 1:
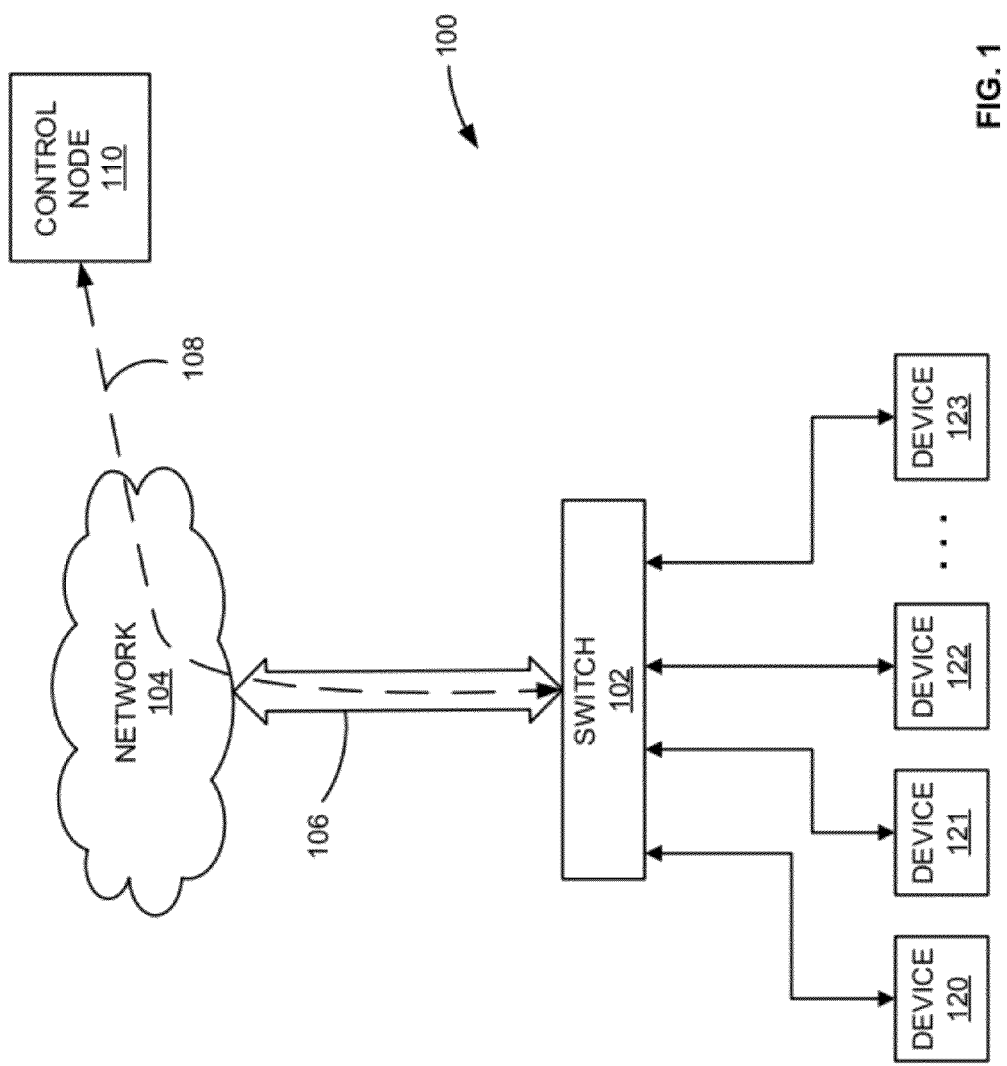
FIG. 1 is a block diagram illustrating a communication switch and its operating environment in an embodiment of the invention.

Referring to FIG. 1, communication system 100 includes switch 102, one or more devices 120-123, network 104, wireless link 106, secure communication path 108 and control node 110. Switch 102 establishes wireless link 106 between switch 102 and network 104 and secure communication path 108 between switch 102 and control node 110. Devices 120-123 are connected to switch 102 and are then able to utilize wireless link 106 and secure communication path 108 to communicate with network 104 and control node 110.

Switch 102 exchanges information with network 104 utilizing wireless link 106. Wireless link 106 may utilize any conventional wireless communication protocols that include code division multiple access (CDMA) 1×RTT, Global System for Mobile communications (GSM), High-Speed Packet Access (HSPA), Evolution-Data Optimized (EV-DO), EV-DO rev. A, Worldwide Interoperability for Microwave Access (WiMAX) and the like. Switch 102 also has the ability to automatically establish secure communication path 108 to exchange information between switch 102 and network 104. A variety of security solutions may be implemented to establish secure communication path 108. One example is a virtual private network (VPN). VPNs are often used by companies or organizations to communicate confidentially over a public network. A VPN can send data across secured and encrypted private channels between two points. Tunneling protocols may also be used to provide VPN and secure communication. Tunneling protocols are network protocols that encapsulate one protocol or session inside a higher layer protocol or a protocol at the same layer. Tunneling may be used to transport a data link layer protocol over a transport layer protocol, as if it were a higher layer protocol. Tunneling may be used to provide various types of VPN functionality such as private addressing. Tunneling protocols that may be utilized include IP security (IPsec), Point-to-Point Tunneling Protocol (PPTP), Layer 2 Tunneling Protocol (L2TP), Multi-Protocol Label Switching (MPLS) and others.

Network 104 could be any packet-based network or packet switching system where packets are routed over data links shared with other traffic. Characteristics of packet-based networks include optimizing channel capacity available in a network, minimizing transmission latency and increasing robustness of communication. For example, network 104 could include many of the public switched data networks (PSDNs) such as the internet protocol network, Frame Relay, Asynchronous Transfer Mode (ATM), General Packet Radio Service (GPRS), Ethernet and others. Network 104 could also include any number of private data networks that would utilize similar protocols.

Control node 110 comprises any computer system configured with software that functions as described herein that has the ability to communicate with network 104. Examples of control node 110 include personal computers, computer workstations, laptop computers, personal digital assistants (PDAs) and others.

Multiple devices 120-123 have the ability to connect to switch 102. FIG. 1 shows 4 devices 120-123. As would be understood by those skilled in the art, any number of combinations of devices 120-123 may be connected to switch 102. Devices 120-123 can include any device that has communication connectivity. This would include but not be limited to personal computers, Ultra-Mobile personal computers (UMPCs), personal digital assistants (PDAs), wireless communication devices and a multitude of other consumer electronics devices. Devices 120-123 could also include numerous types of network elements that may desire secure connectivity to a network 104. Network elements of note are wireless repeaters that are implemented in wireless networks.

Devices 120-123 utilize secure communication path 108 established by switch 102 between switch 102 and control node 110. Each device 120-123 may not have the communication capabilities necessary for direct, secure communication to a network 104 or control node 110. For such devices 120-123, switch 102 establishes the necessary secure communication functionality automatically upon linking devices 120-123 to switch 102. For example, when a device 120-123 with limited resources to support complex communication is linked to switch 102, switch 102 recognizes the device 120-123 and allows device 120-123 to communicate to control node 110 via wireless path 106, network 104 and secure communication path 108.

Figure 2:
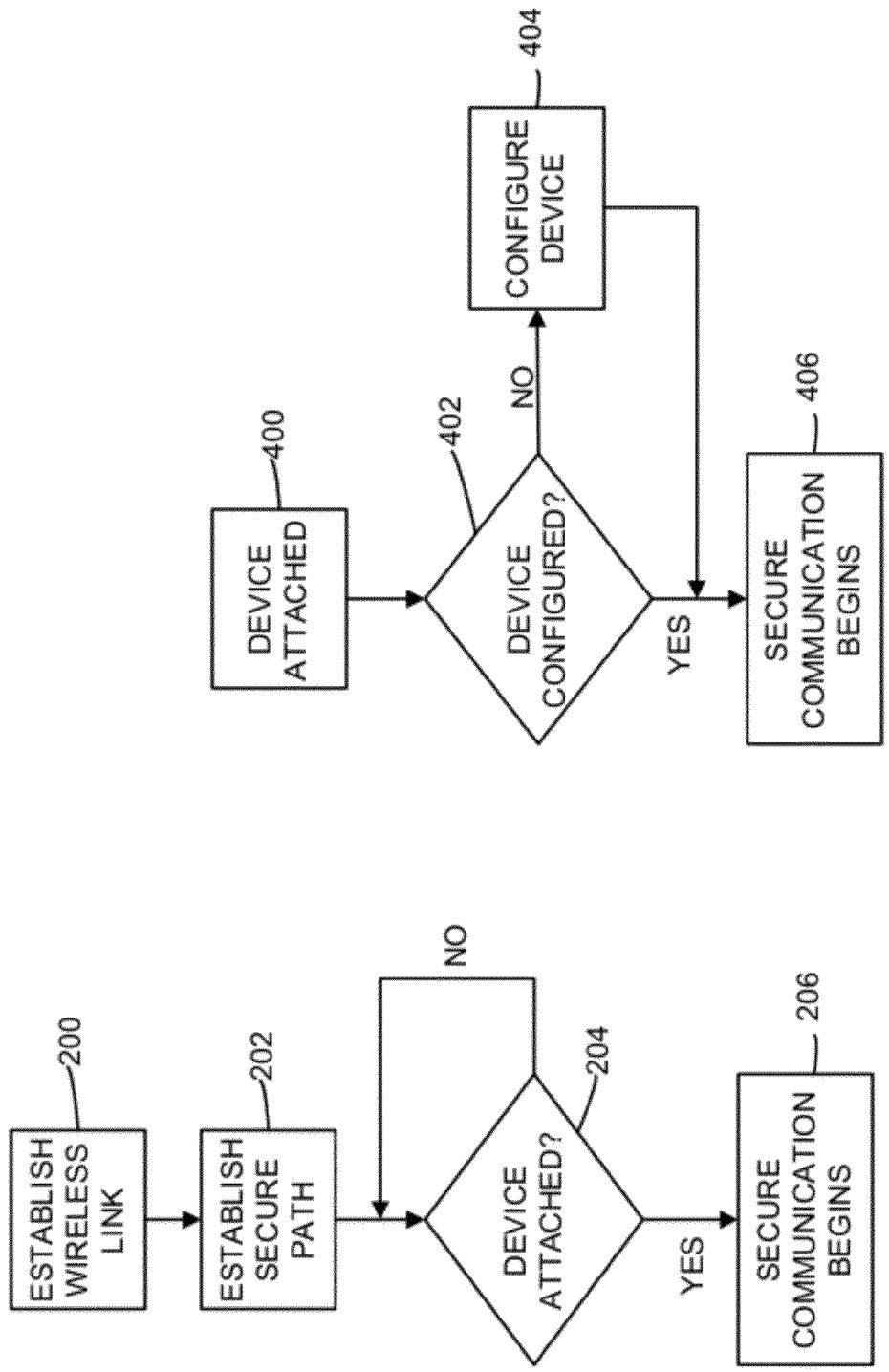
FIG. 2 is a flow diagram illustrating a preferred method for utilizing a communication switch.

In operation, as shown in FIG. 2, when switch 102 is powered-up, wireless link 106 is established between switch 102 and network 104 using a conventional wireless communication protocol (200). Upon establishing wireless link 106, switch 102 creates path 108 with network 104 and control node 110 (202). Switch 102 then determines if device 120-123 is linked to switch 102 (204). If device 120-123 is not attached, switch 102 awaits further instructions upon the connection of device 120-123. If device 120-123 is attached, device 120-123 begins secure communication to control node 110 utilizing wireless link 106 and secure communication path 108 established by switch 102 (206).

Advantageously, switch 102 creates and maintains secure communication path 108 and awaits for devices 120-123 to link with switch 102. Devices 120-123 may or may not have their own secure communication capability and use the established connectivity to obtain secure communication to control node.

Switch Description

Figure 3:
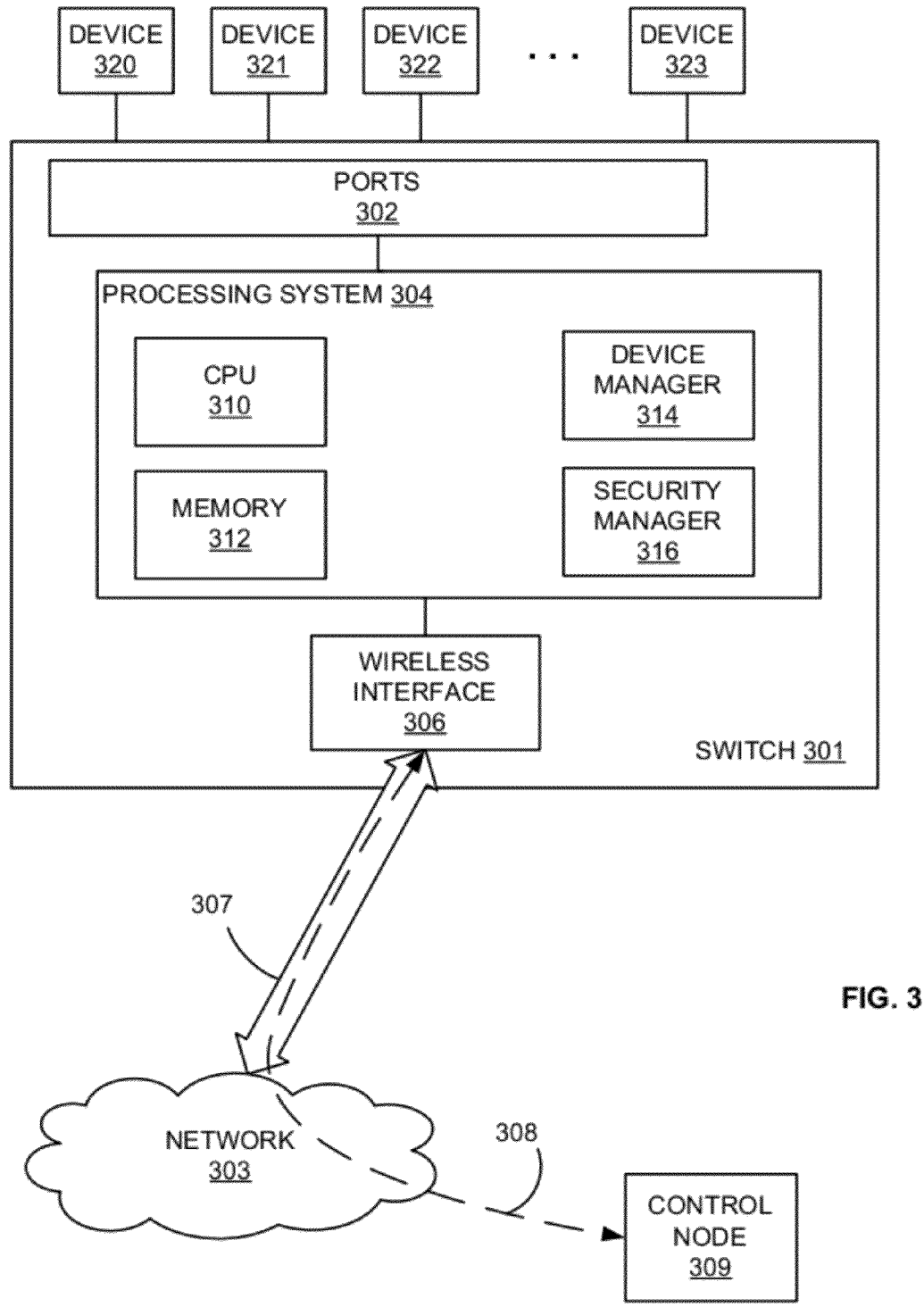
FIG. 3 is a block diagram illustrating a communication switch in an embodiment of the invention.

FIG. 3 illustrates one possible embodiment for switch 301 of the present invention. Switch 301 includes ports 302, processing system 304 and wireless interface 306. Processing system 302 includes central processing unit (CPU) 310, memory 312, device manager 314, and security manager 316 and is linked with ports 302 and wireless interface 306. Switch 301 could be comprised of a programmed general-purpose computer, although those skilled in the art will appreciate that programmable or special purpose circuitry and equipment may be used. Switch 301 may be distributed among multiples devices that together comprise elements 302-316.

CPU 310 could comprise a computer microprocessor, logic circuit, or some other processing device. Processing system 304 may be distributed among multiple processing devices. Memory 312 could comprise a disk, tape, integrated circuit, server, or some other memory device. Memory 312 may be distributed among multiple memory devices.

Elements 310, 314-316 retrieve and execute software from memory 312. Software may comprise an operating system, utilities, drivers, networking software, and other software typically loaded onto a computer system. Software could comprise an application program, firmware, or some other form of machine-readable processing instructions. When executed by CPU 310, device manager 314 or security manager 316, software directs switch 301 to operate as described herein.

Device manager 314 manages devices 320-323 connected via ports 302. Device manager 314 acts as a control node or configuration node to ensure that switch 301 can support devices 320-323. Device manager 314 may also serve to assist with start-up and acquiring necessary software to communicate with devices 320-323. Protocols for establishing internet protocol (IP) addressing for communication include Bootstrap Protocol (BOOTP), Dynamic Host Configuration Protocol (DHCP) or the like and would be used to establish a communication path between the network 104 and devices 320-323. Using conventional IP addressing protocols, device manager 314 may obtain an IP address for each device 320-323 either from a static IP address included with switch 301 or from the control node 309.

Security manager 316 aides in establishing a secure communication path 308 over the wireless path 307 established by the wireless interface 306. For example, secure solutions could be a VPN that utilizes tunneling protocols that would include IP security (IPsec), Point-to-Point Tunneling Protocol (PPTP), Layer 2 Tunneling Protocol (L2TP), Multi-Protocol Label Switching (MPLS) and others.

Wireless interface 306 is linked to processing system 304 and provides communication between switch 301 and network 303. Wireless communication protocols that could be supported include CDMA1×RTT, GSM, HSDPA, EV-DO, EV-DO rev. A, WiMAX and others. One example of wireless interface 306 is a wireless air card that is connected to switch 301 using a Personal Computer Memory Card International Association (PCMCIA) or Universal Serial Bus (USB) port. Alternatively, wireless interface 306 may be a wireless module integrated into switch 301 either with processing system 304 or as a separate module. Wireless interface 306 could comprise a network interface, modem, port, transceiver, or some other communication device. Wireless interface 306 could also be distributed among multiple communication devices.

Ports 302 are communicatively connected to processing system 304. Ports 302 may include Ethernet ports, USB ports, PCMCIA ports or any other type of port, including ultra wideband wireless ports that would allow switch 301 to communicate with devices 320-323.

Ports 302 may also be configured to provide other services for switch 301. For example, USB ports can be used to provide additional connectivity for memory devices including USB memory drives. Additional types of ports 302 may be included on switch 301 that allow for switch 301 to utilize multiple flash memory data storage devices, including CompactFlash, Memory Stick, Secure Digital and the like.

Multiple devices 320-323 have the ability to connect to switch 301. Communication protocols are established using device manager 314 as mentioned above to enable communication between the devices 320-323 and control node 309. As noted above, switch 301 has the ability to dynamically assign IP addresses to each of the devices through its device manager 314.

Devices 320-323 can include any device that has packet communication connectivity. This would include but not be limited to personal computers, ultra-mobile personal computers (UMPCs), personal digital assistants (PDAs), wireless communication devices and a multitude of other consumer electronics devices. Devices 320-323 could also include numerous types of communication network elements that may desire secure connectivity to a packet-based network. Network elements of note are wireless repeaters that are implemented in wireless networks.

Wireless repeaters, also know as cellular repeaters, cell phone repeaters, or wireless cellular signal boosters, are devices used to boost the cell phone reception to a local area. Wireless repeaters include a reception antenna, a signal amplifier and an internal rebroadcast antenna. These provide similar functionality of traditional cellular broadcast towers used to broadcast wireless signals by the network providers, but are much smaller and are usually intended for use in a single broadcast area such as a building. Wireless repeaters work by rebroadcasting cellular signals inside the building. The systems usually use an external, directional antenna to collect the best cellular signal, which is then transmitted to an amplifier unit which amplifies the signal, and retransmits it locally, providing significantly improved signal strength. Because wireless repeaters offer an efficient, inexpensive way of enhancing a wireless network, they typically lack sophisticated interfaces and connectivity for servicing the repeater. Wireless networks supported by wireless repeaters may utilize any number of wireless standards including CDMA1×RTT, GSM, HSDPA, EV-DO, EV-DO rev. A, WiMAX and others.

Wireless repeaters are a low-cost rebroadcasting solution and many times lack sophisticated communication technology allowing them to be serviced or configured from a location remote from the repeater. Utilizing a traditional communication port such as an Ethernet or USB port, users can access the wireless repeater to perform a variety of services. One solution for accessing the wireless repeaters is to provide wireless communication to the repeater. A disadvantage for such a solution is that it is inefficient and costly to establish individual wireless sessions to the repeater.

Preferably, it is desired to have a solution that provides remote access to multiple repeaters by using a secure wireless link. This provides an efficient mechanism for configuring multiple devices. This can be accomplished by pushing a single software update to the switch 301 whereby devices 320-323 can then be updated as they come on-line. Alternatively, this can be accomplished by broadcasting software updates to all the devices simultaneously by utilizing switch 301 as the central communication path.

Another advantage of utilizing the switch in this manner is that only one secure wireless link need be established for multiple devices 320-323. This eliminates the need for each device 320-323 to have wireless and security capabilities, thereby reducing costs associated with devices 320-323.

Devices 320-323 contemplated by this invention need not be limited to those with limited resources. It may be advantageous for users to utilize a central, secure switch for communication without having to establish individual security sessions for each device 320-323. For example, if devices 320-323 are personal computers that have the resources available to establish their own communication sessions, are linked to switch 301, each personal computer can enjoy the secure communication path that is established automatically upon linking the personal computer to the switch 301. This reduces the need for each personal computer to establish its own secure channel individually and provides a unified, common pathway for secure communication.

Switch 301 may be implemented in a mobile environment where switch 301 is located in an automobile. When deployed, switch 301 may receive devices 320-323 that are any consumer electronic device that would have communication capability including but not limited to mobile phones, PDAs, personal computers, cameras and the like. This would enable the non-secure devices 320-323 to enjoy a single, secure connection to the network.

FIG. 4 refers to a preferred operation of configuring devices 320-323 to communicate with control node 309 utilizing switch 301. Once device 320-323 is connected to switch 301 (400), switch 301 determines if device 320-323 requires configuration (402). If device 320-323 is properly configured, then secure communication can begin between device 320-323 and control node 309 (406). If device 320-323 requires configuration, then switch 301 alone or in conjunction with control node 309 performs any number of steps to configure devices 320-323 to communicate with control node 309 (404). For example, device 320-323 may require additional software to establish a communication path to switch 301. In such a case, switch 301 may provide the necessary software.

Devices 320-323 may be managed remotely from control node 309 utilizing switch 301. Because a secure communication path exists between switch 301 and control node 309, devices 320-323 may be configured and maintained through a central location. For example, devices 320-323 may need a common software fix. The software can be sent over the secure communication path to switch 301 where it is then stored on switch 301. The switch can then broadcast the software to the devices via ports 302 that each have unique IP addresses associated with each device.

Alternatively, devices 320-323 may be set-up individually as a device is connected to a port in the switch. As a device is connected to port 302, switch 301 recognizes that a device has been connected. Switch 301 checks to see if this device has been previously configured in switch 301. If device 320-323 has not been configured, switch 301 establishes a unique IP address for the port where the device is connected. As described above, switch 301 may have the ability to assign an IP address for each device 320-323. Alternatively, by using established protocols such as BOOTP or DHCP, devices 320-323 or switch 301 are able to request and obtain an IP address from control node 309 that has a list of addresses available for assignment. The control node 309 ensures that all IP addresses are unique so that no IP address is assigned to a second device or client while the first client's assignment is valid. Switch 301 then determines if device 320-323 has the appropriate software to enable the device to utilize the secure communication link. If the device software is not available, then switch 301 retrieves the necessary software from the network or from its own memory. Upon receiving the software at the switch, switch 301 downloads the configuration software to the device 320-323 to allow operation through switch 301.

Figure 5:
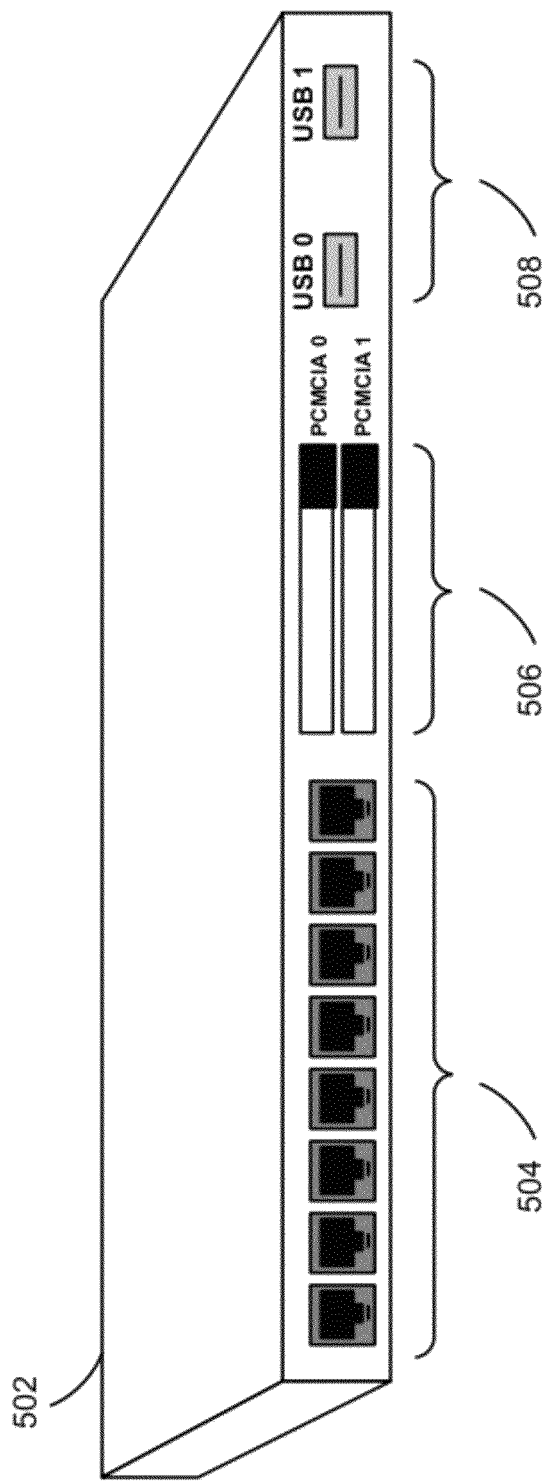
FIG. 5 is a view of a communication switch.

Another embodiment of the present invention is illustrated in FIG. 5. Switch 502 has Ethernet ports 504, PCMCIA ports 506 and USB ports 508. In this embodiment, Ethernet ports 504 and are utilized to communicate with devices 320-323

(not shown). PCMCIA ports 506 are utilized to accept wireless air cards (not shown) to provide communication to network 303 and control node 309. USB ports 508 provide multiple functions. USB ports may receive wireless air cards similar in functionality to PCMCIA ports 506. Additionally, USB ports 508 may provide connectivity to devices 320-323 (not shown). USB ports 508 may also be utilized to accept memory devices as described above. All of the ports 504-508 have the ability to provide connectivity either to devices 320-323, wireless air cards or both.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication switch comprising:
    a plurality of communication ports configured to connect to a plurality of devices;
    a wireless interface configured to establish a wireless link to a network;
    a processing system configured to initiate a secure path to a control node over the wireless link, exchange communications with ones of the devices that are connected to the communication ports, and exchange the communications over the secure path with the control node; and
    the processing system is further configured to determine if a software update is available for the connected devices, and if the software update is available, to transfer the software update to the connected devices through the communication ports.

2. The communication switch of claim 1 wherein at least some of the communication ports comprise wireless ports.

3. The communication switch of claim 1 wherein at least some of the communication ports comprise ultra-wideband wireless ports.

4. The communication switch of claim 1 wherein at least some of the communication ports comprise Ethernet ports.

5. The communication switch of claim 1 wherein at least some of the communication ports comprise Universal Serial Bus (USB) ports.

6. The communication switch of claim 1 wherein the secure path comprises a Virtual Private Network (VPN) tunnel.

7. The communication switch of claim 1 wherein the processing system is configured to allocate Internet Protocol (IP) addresses to the connected devices.

8. The communication switch of claim 1 wherein the processing system is configured to receive the software update from the control node over the secure path.

9. The communication switch of claim 1 wherein the software update supports the exchange of the communications between the processing system and the devices.

10. The communication switch of claim 1 wherein the processing system is configured to initiate the wireless link and the secure path responsive to switch power up.

11. A method of operating a communication switch having communication ports, the method comprising:
    establishing a wireless link to a network;
    initiating a secure path to a control node over the wireless link;
    exchanging communications with devices that are connected to the communication ports and exchanging the communications over the secure path with the control node;
    determining if a software update is available for the connected devices, and if the software update is available, then transferring the software update to the connected devices through the communication ports.

12. The method of claim 11 wherein at least some of the communication ports comprise wireless ports and wherein exchanging the communications with the connected devices comprises exchanging wireless communications.

13. The method of claim 11 wherein at least some of the communication ports comprise ultra-wideband wireless ports and wherein exchanging the communications with the connected devices comprises exchanging ultra-wideband wireless communications.

14. The method of claim 11 wherein at least some of the communication ports comprise Ethernet ports and wherein exchanging the communications with the connected devices comprises exchanging Ethernet communications.

15. The method of claim 11 wherein at least some of the communication ports comprise Universal Serial Bus (USB) ports and wherein exchanging the communications with the connected devices comprises exchanging USB communications.

16. The method of claim 11 wherein initiating the secure path and exchanging the communications over the secure path comprises initiating a Virtual Private Network (VPN) tunnel and exchanging the communications over the VPN tunnel.

17. The method of claim 11 further comprising allocating Internet Protocol (IP) addresses to the connected devices.

18. The method of claim 11 further comprising receiving the software update from the control node over the secure path.

19. The method of claim 11 wherein the software update supports the exchange of the communications between the communication switch and the devices.

20. The method of claim 11 wherein initiating the wireless link and the secure path comprises initiating the wireless link and the secure path responsive to switch power up.

* * * * *